United States Patent [19]
Phillips et al.

[11] Patent Number: 5,572,223
[45] Date of Patent: Nov. 5, 1996

[54] APPARATUS FOR MULTI-POSITION ANTENNA

[75] Inventors: James P. Phillips, Lake in the Hills; Louis J. Vannatta; Eric L. R. Krenz, both of Crystal Lake, all of Ill.

[73] Assignee: Motorola, Inc., Schaumburg, Ill.

[21] Appl. No.: 307,224

[22] Filed: Sep. 16, 1994

Related U.S. Application Data

[63] Continuation-in-part of Ser. No. 278,295, Jul. 21, 1994.
[51] Int. Cl.$^6$ ...................................................... H01Q 1/24
[52] U.S. Cl. ........................... 343/702; 343/725; 343/726; 343/833
[58] Field of Search ..................................... 343/725, 726, 343/702, 700 MS, 741, 833, 834; 455/89, 90; H01Q 1/24

[56] References Cited

U.S. PATENT DOCUMENTS 5,337,061  8/1994  Pye et al. ................................. 343/749

Primary Examiner—Michael C. Wimer
Attorney, Agent, or Firm—Randall S. Vaas

[57] ABSTRACT

A multi-position antenna apparatus is provided for a device including a first housing portion and a second housing portion which are interconnected such that they move relative to one another between a collapsed position and an extended position. The device includes radio circuitry positioned in the first housing portion. The antenna apparatus includes a first antenna supported in the second housing portion. The first antenna is coupled to the radio circuitry in the extended position and in the collapsed position. A parasitic radiator is supported in the first housing portion and is only coupled to the first antenna when the housing is in the collapsed position. The parasitic radiator is a quarter wavelength of the signaling frequency or an integer multiple thereof. The parasitic radiator may include a member inductively or capacitively coupled to the first antenna when the flap is closed. Alternatively, the parasitic radiator may be a patch radiator or a loop conductor. An end of the parasitic radiator may be connected to ground.

20 Claims, 13 Drawing Sheets

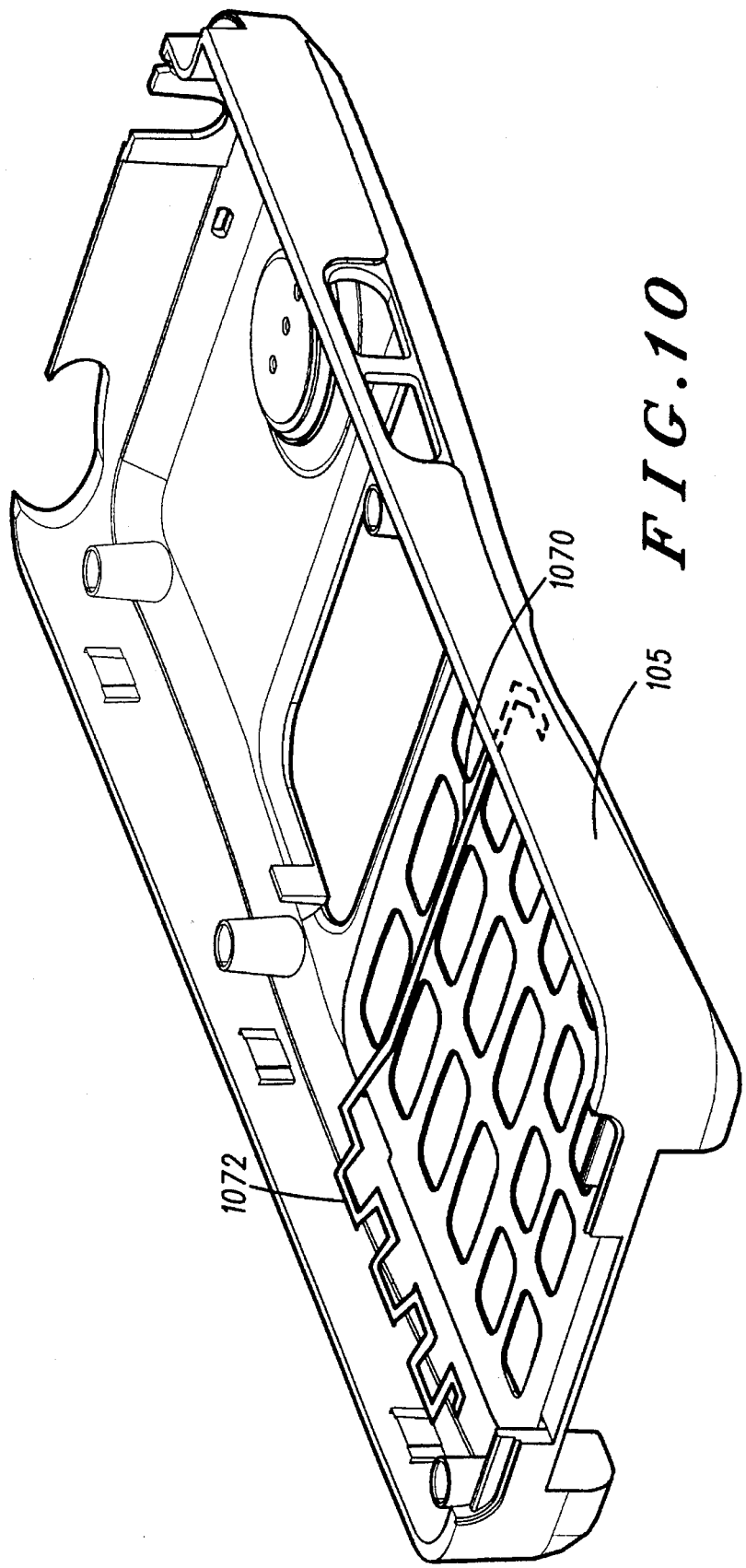

APPARATUS FOR MULTI-POSITION ANTENNA

This is a continuation-in-part of application Ser. No. 08/278,295, filed Jul. 21, 1994.

FIELD OF THE INVENTION

The present invention pertains to antennas for communication apparatus.

BACKGROUND OF THE INVENTION

Radio communication devices include a transmitter and/or receiver coupled to an antenna which emits and/or detects radio frequency signals. The device may include a microphone for inputting audio signals to a transmitter or a speaker for outputting signals received by a receiver. Examples of such radio communication devices include one way radios, two way radios, radio telephones, personal communication devices, and a variety of other equipment. These communication devices typically have a standby configuration, wherein the device is collapsed for storage, and an active communication configuration, wherein the antenna is extended for optimum performance.

For radio telephones and two-way radios, it is typically desirable that these devices have a small size during a standby mode to facilitate storage and transport thereof. For example, users prefer that the radio telephones are small enough in the standby mode to permit storage in a shirt or jacket pocket. In the active communication state, it is desirable for the device to be sufficiently long to position the speaker adjacent to the user's ear, the microphone near the user's mouth, and the antenna away from the user's body. It is desirable for the antenna to be positioned away from the user's body since the user's body is a large conducting object that interferes with radio frequency signal reception. One particularly effective way of positioning the antenna away from the user's body is to extend the antenna away from the device body during use. By providing an antenna which collapses for storage and extends for active communication, an antenna with optimum active mode operation is provided in a readily storable device.

A difficulty encountered with such reconfigurable communication devices is providing a high performance antenna in the standby mode. For example, radio telephones are known that receive paging signals, electronic mail, and call alerting signals in the standby mode. However, the body of the device, including the internal electronic circuitry within the body, is typically in the reactive near-field of the antenna in the storage position. These conductive objects in the reactive near-field degrades performance of the antenna, which is detrimental to signal reception in the standby mode.

An example of a radio communication device including a multi-position antenna is a radio telephone including a body and, wherein the flap incudes an antenna mounted thereon. When closed, the flap covers the radio telephone key pad and provides a compact housing. When the flap is opened, the flap antenna is spaced from the telephone body which the user holds. Although the flap antenna performs very well when the flap is open, the proximity of the radio telephone body in the closed flap position interferes with the operation of the antenna in the collapsed standby mode.

Accordingly, it is desirable to provide an antenna system having high performance characteristics when the communication device is extended in an active communication mode and when the communication device is collapsed in a standby mode of operation.

BRIEF DESCRIPTION OF THE DRAWINGS

FIG. 10 is a fragmentary perspective view illustrating the interior of the front housing section of the radio telephone body and an alternate embodiment of the parasitic radiator;

FIG. 15 is a top view schematically illustrating the position of the relative positioning of the flap antenna and parasitic radiator according to FIG. 14 in the collapsed position of the device;

FIG. 23 is a top view schematically illustrating the position of the relative positioning of the flap antenna and parasitic radiator according to FIG. 20 in the collapsed position of the device.

DETAILED DESCRIPTION OF THE PREFERRED EMBODIMENTS

The present invention is embodied in a multi-position antenna system for a device including a housing having first and second housing portions which move between a first extended position and a second collapsed position. A multi-position antenna apparatus is provided for a device including a first housing portion and a second housing portion which are interconnected such that they move relative to one another between a collapsed position and an extended position. The device includes radio circuitry positioned in the first housing portion. The antenna apparatus includes a first antenna supported in the second housing portion. The first antenna is coupled to the radio circuitry in the extended position and in the collapsed position. A parasitic radiator is supported in the first housing portion and is only coupled to the first antenna when the housing is in the collapsed position. The parasitic radiator is a quarter wavelength of the signaling frequency or an integer multiple thereof. The parasitic radiator may include a member inductively or capacitively coupled to the first antenna when the flap is closed. Alternatively, the parasitic radiator may be a patch radiator or a loop conductor. An end of the parasitic radiator may be connected to ground. The antenna system has high performance characteristics when the housing is is in the first extended position during active communication and when the first antenna and the parasitic radiator are electrically coupled while the housing is collapsed.

The antenna system according to the invention is illustrated in a radio telephone 100 (FIG. 1) including a second housing portion or flap 103, wherein the immediate invention is particularly advantageous. However, the invention may also be advantageously employed in other devices, such as one way and two way radios, personal communication devices, or any other radio communication equipment employing an antenna. Accordingly, "device" as used herein refers to all such devices and their equivalents.

Figures 1, 2:
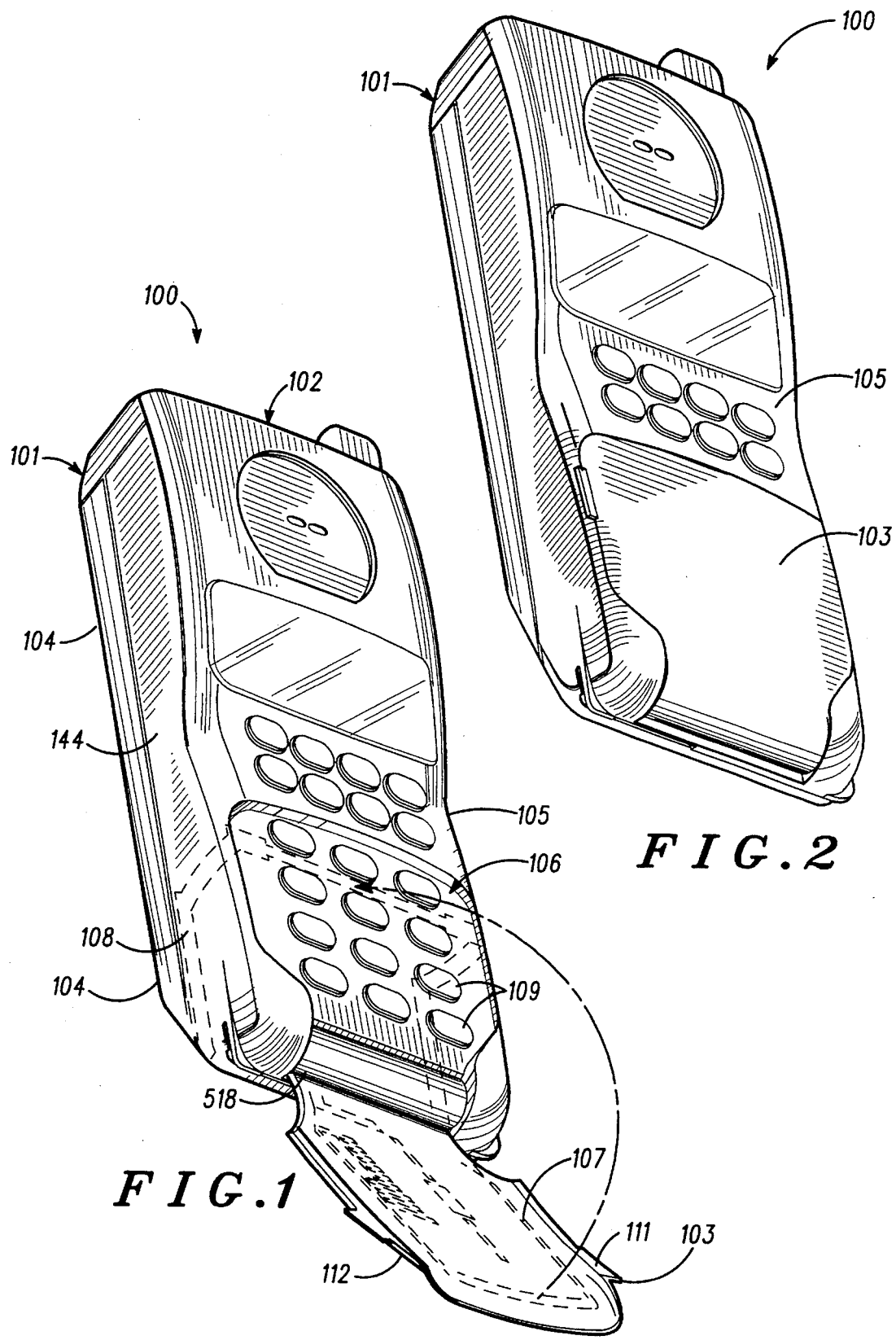
FIG. 1 is a front perspective view illustrating an extended radio telephone.
FIG. 2 is a front perspective view illustrating a collapsed radio telephone according to FIG. 1.

A radio telephone 100 is illustrated in FIG. 1. The radio telephone includes a housing 102 having a first housing portion 101 and a second housing portion 103. In the illustrated embodiment, the first housing portion 101 is a radio telephone body and the second housing portion is a flap pivotably connected to the body. The flap housing portion 103 rotates between an extended configuration illustrated in FIG. 1 during an active communication mode and a collapsed, or closed, configuration, illustrated in FIG. 2, in a standby mode.

Figure 3:
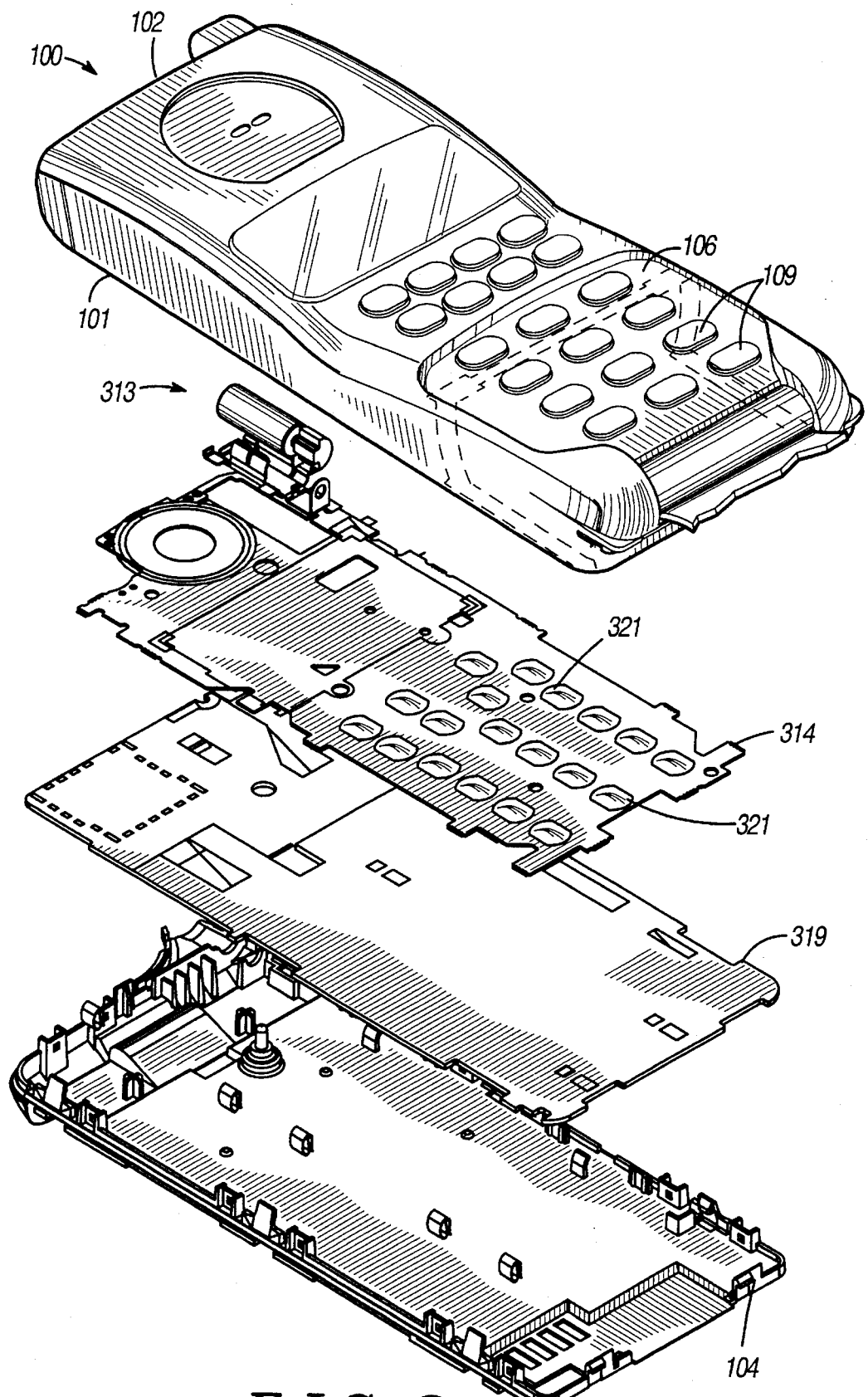
FIG. 3 is an exploded view illustrating the front housing, the radio frequency (RF) printed circuit board, logic printed circuit board, and rear housing of the radio telephone according to FIG. 1.

The radio telephone first housing portion 101 includes a back body housing section 104 (FIG. 3) and a front body housing section 105 which are interconnected to define an interior volume housing electronic circuitry including logic circuit board 314 and RF circuit board 315. A key pad 106 (FIG. 1) is positioned in body 101 such that keys 109 (only some of which are numbered) associated with the keypad are accessible for manual actuation by the user. The keys 109 are actuated manually to close popple switches 321 (FIG. 3, only some of which are numbered). The illustrated flap housing portion 103 at least partially covers key pad 106 when closed as shown in FIG. 2. The flap housing portion 103 may be longer to cover all the keys 106. The flap housing portion 103 prevents actuation of the keys 109 that are covered when the flap housing portion is closed. Additionally, the flap housing portion can place the radio telephone 100 in a standby mode when closed.

Figure 5:
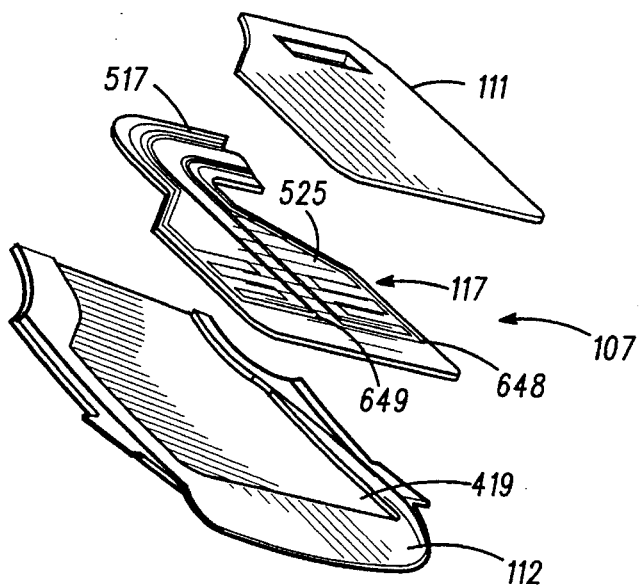
FIG. 5 is a fragmentary exploded view illustrating the flap housing sections and the flap antenna.

The flap housing portion 103 includes an antenna 107 (FIG. 5), which is referred to herein as a flap antenna. The flap antenna is positioned between a front flap housing section 111 and a back flap housing section 112 (and thus is illustrated in phantom in FIG. 1). The front flap housing section 111 and back flap housing section 112 are generally planar members manufactured of a suitable dielectric material, such as an organic polymer. The back flap housing section 112 includes a recess 419 (FIG. 5) for receipt of flap antenna 107 and front flap housing section 111. The flap antenna 107 is sandwiched between these flaps sections when the flap is fully assembled. The flap antenna 107 is in an extended, open, position when the flap housing portion 103 is open as illustrated in FIG. 1. The flap antenna 103 is in a collapsed, or retracted, position when flap housing portion 103 is closed as illustrated in FIG. 2.

Figure 4:
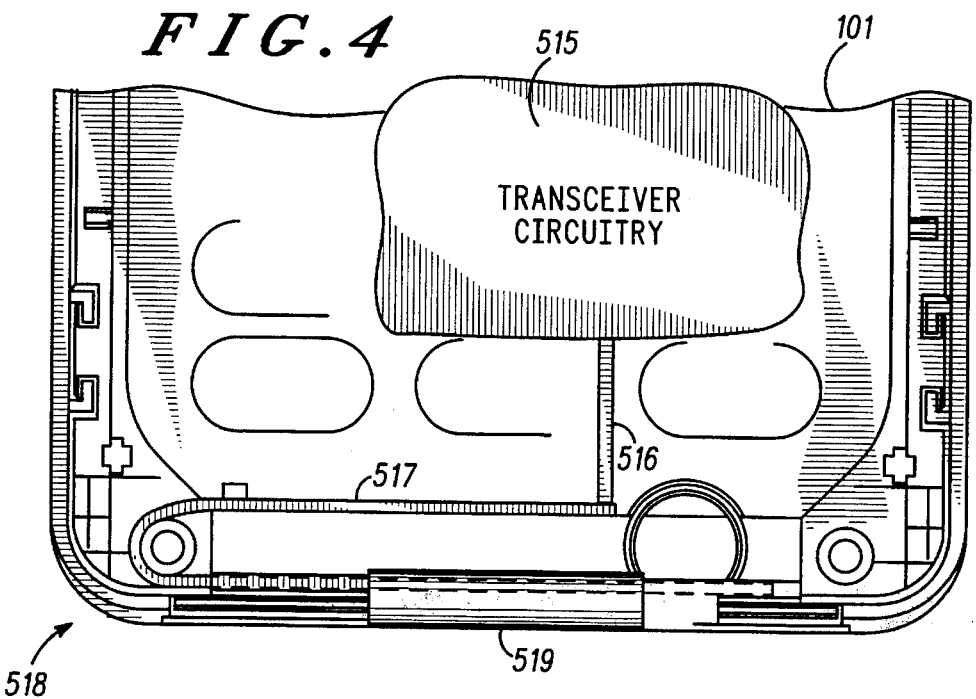
FIG. 4 is a fragmentary view illustrating schematically the interior radio telephone according to FIG. 1 and a transceiver.

Transceiver circuitry 515 is generally illustrated in FIG. 4. The transceiver circuitry is supported on RF circuit board 315, and may be implemented using any suitable conventional transceiver. The transceiver circuitry 515 is assembled to RF circuit board 315 by conventional means. Circuit board 315 and logic printed circuit board 314 are mounted between the front and back body housing sections 104 and 105 by any suitable means. The circuitry in radio telephone 100 includes a microphone (not shown) and receiver (not shown) positioned in first housing portion 101. The transceiver circuitry 515 is connected to an elastomeric connector 516 or other means, which connects to a flex conductor, or transmission line, 517. The flex conductor 517 extends into a hinge assembly 518, including a knuckle 519. The flex conductor 517 extends from the flap antenna 107 through the hinge assembly 518. The hinge assembly 518 provides the connection between the flap housing portion 103 and the body housing portion 105 and includes transmission line 517. The transmission line and hinge may have any suitable construction, such as the hinge disclosed in U.S. patent application Ser. No. 08/148,718, filed on 08 Nov. 1993 in the name of Tanya Rush et al., the disclosure of which is incorporated herein by reference thereto.

Figure 6:
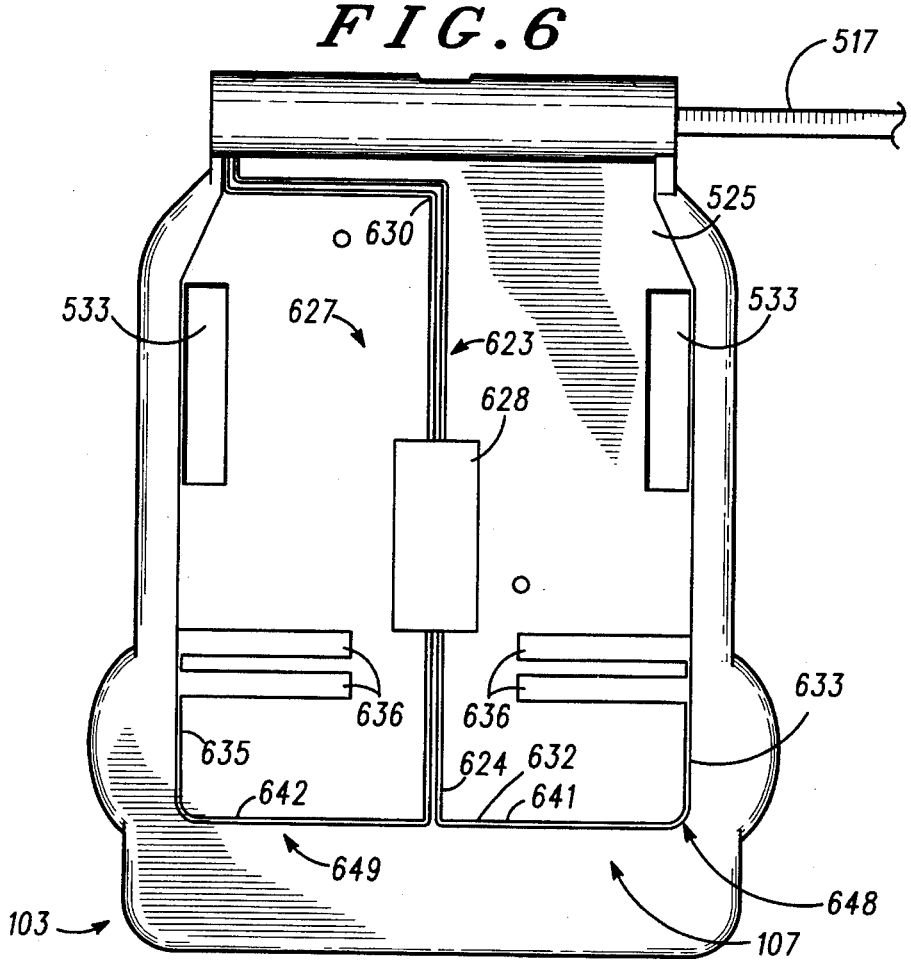
FIG. 6 is a top plan view illustrating of a flap back housing section and flap antenna.

Flip antenna 107 (FIG. 6) includes dipole arms 648 and 649, manufactured of two thin strips of a suitable conductor, such as copper, copper alloy, aluminum alloy, or the like. The transmission line 517 is connected to the dipole arms 648 and 649 via an impedance transformer 627. The impedance transformer includes sections 623, 628 and 624. Section 623 is connected to transmission line 517 at junction 630. Section 624 is connected to dipole arm 649 at junction 631. Section 624 is connected to dipole arm 648 at junction 632. Impedance transformer 627 provides impedance matching between dipole arms 648, 649 and the transmission line 517. Dipole arm 648 includes a high current section 641 and a generally orthogonal extending folded section 633. Dipole arm 649 similarly includes a high current section 642. High current section 642 is connected to a folded section 635, which extends generally orthogonally to high current section 641. Members 636 on folded section 633 are capacitively coupled. Members 636 and folded section 635 are capacitively coupled. These members load the antenna such that it may be smaller in dimension. The high current sections 641 and 642 are low impedance sections of the antenna. Stubs 950 and 951 are the low current, high impedance, portion of the antenna. Total length of flap antenna is a half-wave, illustrated for 1.5 GHz. The antenna would be larger for lower frequency communication signals, such as 800 MHz signals.

Openings 533 are provided in antenna body 525 for receipt of respective magnets (not shown). The magnets actuate read switches (not shown) in the first housing portion 101 to change the radio telephone 100 between a standby mode and an active communication mode. The read switches and magnets are not described in greater detail herein since they do not form a part of the immediate invention.

Figure 9:
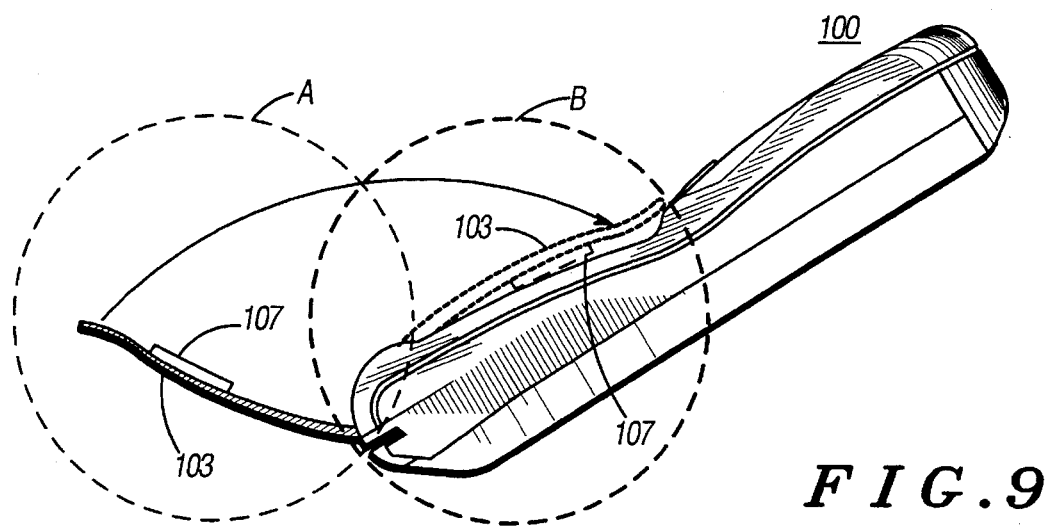
FIG. 9 is a side elevational view of a radio telephone schematically illustrating the reactive near-field of the flap antenna in the open and closed positions of the flap.

The flap antenna 107 has a reactive near field volume A (FIG. 9) in the open position and a reactive near field volume B in the closed position. Those skilled in the art will recognize that the effective dielectric constant of the material and/or the presence of conductors in the near field space effects the performance of the antenna. Consequently, an antenna tuned to one frequency for a near field volume having one dielectric constant will not be tuned for the same frequency in a near field volume having another dielectric constant. The dielectric constant of the near field volume when the flap antenna 107 is in the open position is 1, since the near field volume A is predominantly air, and no conductors are present. The dielectric constant of the near field volume B for the antenna in the closed position is significantly different from that of air because of the substantial presence of body housing portion 101. Also, the conductive transceiver circuits are now in the near field. Consequently, an antenna tuned for the extended position will not be tuned for the collapsed, or closed position, and performance is degraded in the closed position if the antenna is tuned for the operating frequency of the transceiver when the antenna is in the open position.

Figure 7:
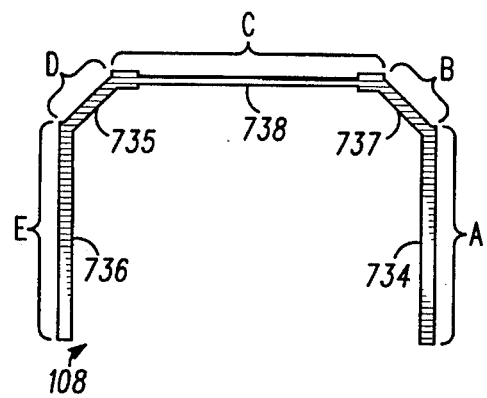
FIG. 7 is a top plan view illustrating a parasitic radiator.

Parasitic radiator 108 is illustrated in FIG. 7. The parasitic radiator 108 provides an antenna tuned to the signaling frequency of transceiver 515 when the flap is closed. The antenna is a one piece or multiple piece conductor which is generally U-shaped in configuration. The radiator includes arms 734 and 736 extending generally orthogonally to a shoulder 738. An elbow 737 extends at an angle of approximately 45° with respect to arm 734 and shoulder 738 to join these members. An elbow 735 extends at an angle of approximately 45° with respect to arm 736 and shoulder 738 to join them. This antenna is manufactured from any suitable electrical conductor, such as a thin, flexible copper strip having an adhesive on one side thereof.

The parasitic radiator is dimensioned such that it is tuned to the operating frequency of transceiver circuitry 515 when the flap is closed. More particularly, the longitudinal axis of arm 734 has a length A, the longitudinal axis of elbow 537 has a length B, the longitudinal axis of shoulder 738 has a length C, the longitudinal axis of elbow 735 has a length D, and the longitudinal axis of arm 736 has a length E. Lengths A, B, C, D, and E are such that their sum is equal to approximately one-half the wavelength of the transceiver circuitry communication signal frequency.

Figure 8:
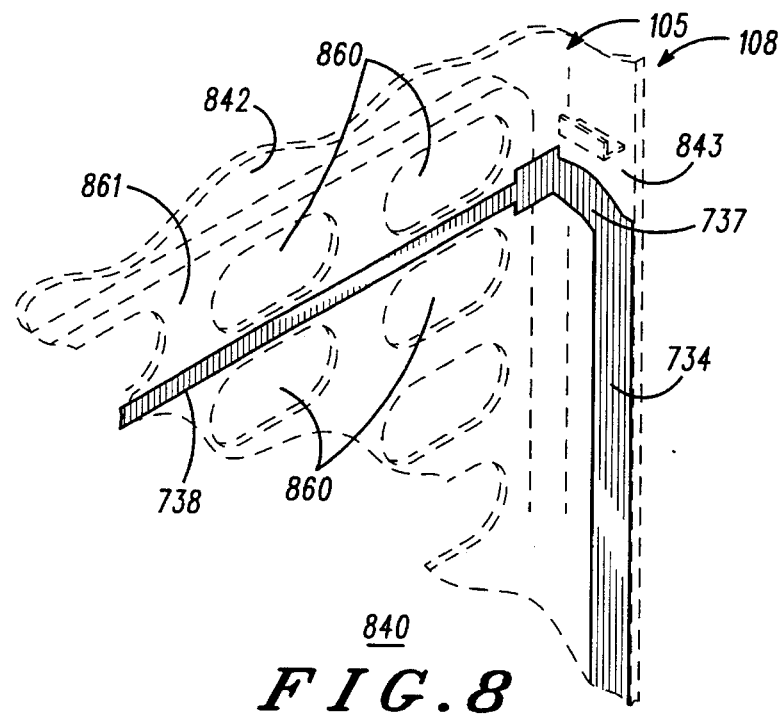
FIG. 8 is a fragmentary perspective view illustrating the inside surface of the front housing section of the radio telephone body and parasitic radiator assembled thereto.

The parasitic radiator 108 (FIG. 8) is connected to an inside surface 840 of front housing section 105. The front housing section includes a planar front 842 and a sidewall 843 extending generally orthogonally thereto. An opposite sidewall 144, which is not shown in FIG. 8 but can be seen in FIG. 1, extends in parallel to sidewall 843. The parasitic radiator 108 is assembled to inside surface 840 of the front housing section 105 using a suitable adhesive. The body antenna is flexible such that it conforms to the surface 840 of the front housing section when attached thereto. More particularly, the shoulder 738 of parasitic radiator 108 is affixed to the inside surface 840 on a strip 861 of housing 105 that is between two rows of apertures 860, through which keys 109 (FIG. 1) of keypad 106 project. The shoulder 738 of parasitic radiator 108 is narrow such that it fits snugly between the rows of apertures without extending into these apertures to avoid interference with the operation of keys 109. Elbow 737 is attached to surface 840 such that it curves from the front wall 842 to the side wall 843. Arm 734 is attached to wall 843 using an adhesive such that it extends along this side wall. Most preferably wall 843 is flat such that the arm 734 extends in a single plane. Arm 736 and elbow 735 are similarly connected to side wall 144. In this manner, the thin flexible strip is attached to the inside of the front housing section with the shoulder 735 of the parasitic radiator 108 positioned at a predetermined location.

The positioning of the flap antenna 107 on flap housing portion 103 is such that high current sections 641 and 642 are at predetermined locations thereon. The predetermined locations of the cross members 641 and 642 are such that when the flap is closed, these sections are in parallel with shoulder 738, and near to strip 861 of front wall 842 which is between the two rows of apertures 860 and to which the shoulder 738 of the parasitic radiator is connected. Thus, when the flap is closed, the high current sections 641 and 642 and the shoulder 738 are aligned and positioned proximate one another, as represented by the end position of the arrow in FIG. 1. The high current sections 641 and 642 and the shoulder 738 are spaced by the thickness of the front housing section 111 of the flap housing portion 103 and the front housing section of the body 101. Additionally, the shoulder 738 of the parasitic radiator 108 is inductively coupled to the high current sections 641 and 642 only when the flap is closed. Because shoulder 738 is coupled to cross members 641 and 642 when the flap is closed, the parasitic 108 forms a second dipole antenna which is parasitically coupled to dipole antenna 107. This coupling is an inductive coupling.

In operation, when the flap is open, flap antenna 107 is positioned away from the parasitic radiator 108 and body 101 such that the antenna has high performance characteristics without interference from the user, circuitry in the body housing 101, or the body housing 101. In this position, the high current section of the flap antenna 107 is remote from shoulder 738 of parasitic radiator 108, such that the parasitic radiator is not coupled to antenna 107. When the flap is closed, as illustrated in FIG. 2, the flap antenna is moved to a position proximate the body and the circuitry in housing 101. This causes decrease in the performance of antenna 107 because body portion 102 is in the near field volume B of the flap antenna. However, the high current section 641 and 642 of the flap antenna 107 are positioned proximate to shoulder 738, such that the two antennas are parasitically coupled. The antenna system performance characteristics are thus affected by both the parasitic radiator 108 and the flap antenna 107 while the flap is closed. The parasitic radiator is tuned to the communication signal frequency of the transceiver circuitry 515 when the body is in the near field volume B. One of the antennas is thus tuned to the communication signal frequency when the flap is open and when the flap is closed. This coupling of antennas significantly improves the characteristics of the antenna system when the flap is closed, such that there is no significant degradation of the antenna performance caused by collapsing the radio telephone for storage. Consequently, the flap antenna does not impair the radio telephone's ability to receive an incoming call alerting signal, a paging signal or an E-mail signal.

FIG. 10 illustrates a generally L-shaped full wave length parasitic radiator. The parasitic is formed of two sections 1071 and 1072, the sum of whose total length is approximately one wavelength of the operating frequency, or signaling frequency. Section 1071 has the maximum current on the parasitic. The parasitic radiator 1070 is a thin strip electrical conductor, tuned to the communication signal frequency of the transceiver circuitry 515 when the flap is closed, and may be manufactured from the same material as parasitic radiator 108.

Figure 11:
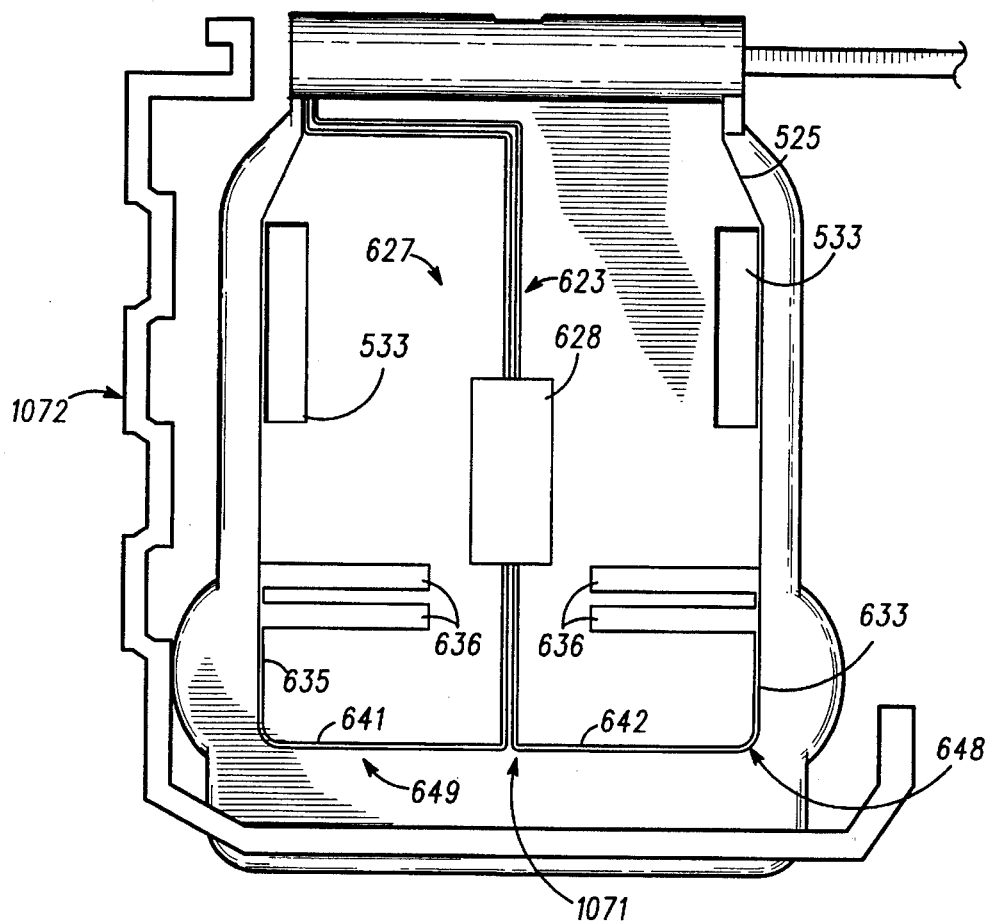
FIG. 11 is a top view schematically illustrating the position of the relative positioning of the flap antenna and parasitic radiator according to FIG. 10 in the collapsed position of the device.

When the flap housing portion 103 is closed, as illustrated in FIG. 11, section 1071 is positioned parallel to, and near high-current sections 641 and 642, such that section 1071 is inductively coupled to the high current sections of the flap antenna. The flap antenna and the parasitic radiator are spaced by the thickness of the flap housing section 111 (FIG. 1) and the thickness of the front housing section 105. The high current portion of the parasitic radiator and the high current portion of the flap antenna preferably extend substantially parallel to one another when the flap is closed. In general, the parasitic radiator can be any resonant length. For example, any integer multiple of one-half wave and shaped into various L or U shapes as needed, so long as a high current portion of the parasitic radiator is held close to the high current portion 641 and 642 of the flap antenna 107 when the flap is closed. Antenna 107 and parasitic radiator 1070 are not coupled when the flap housing portion is opened to the position illustrated in FIG. 1.

Figure 12:
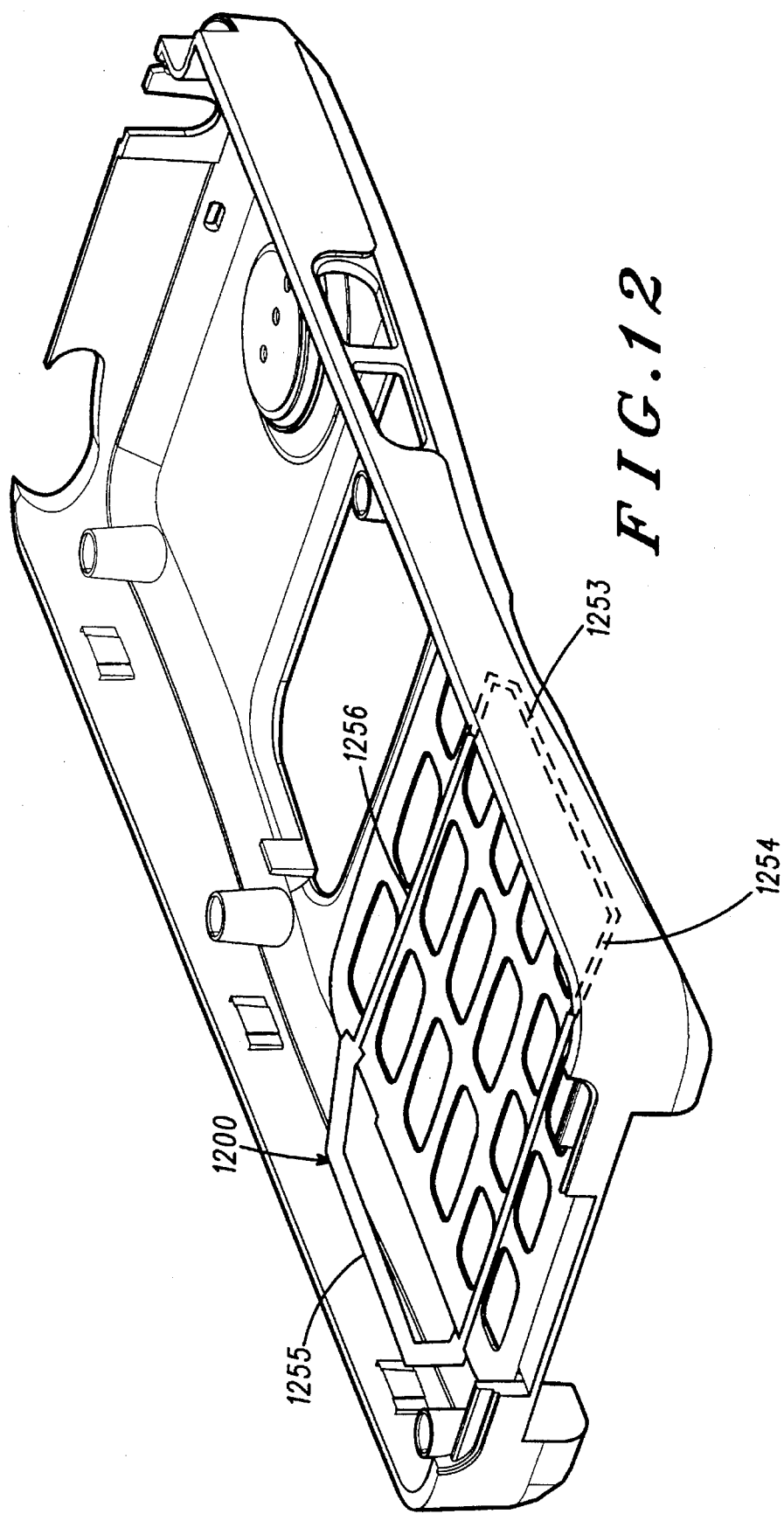
FIG. 12 is a fragmentary perspective view illustrating the interior of the front housing section of the radio telephone body and an alternate embodiment of the parasitic radiator.

A loop type parasitic radiator is illustrated in FIG. 12. The total circumference of the parasitic (the sum of lengths of sections 1253–1256) is equal to approximately one wavelength at the communication signal frequency. However, the loop may be shortened by adding capacitive loading to the antenna in the form of a series capacitor in section 1254. Portion 1256 is a high current portion held close to the high current portions 642 and 641 of the flap antenna 107 when the flap is closed. The loop may also have a cross over configuration to permit the fitting of the needed circumference within the confines of the radio if a lower frequency, thus, higher length antenna, is required. The parasitic radiator is a thin strip electrical conductor, tuned to the operating frequency of the transceiver circuitry 515 when the flap is closed, and may be manufactured from the same material as parasitic radiator 108.

Figure 13:
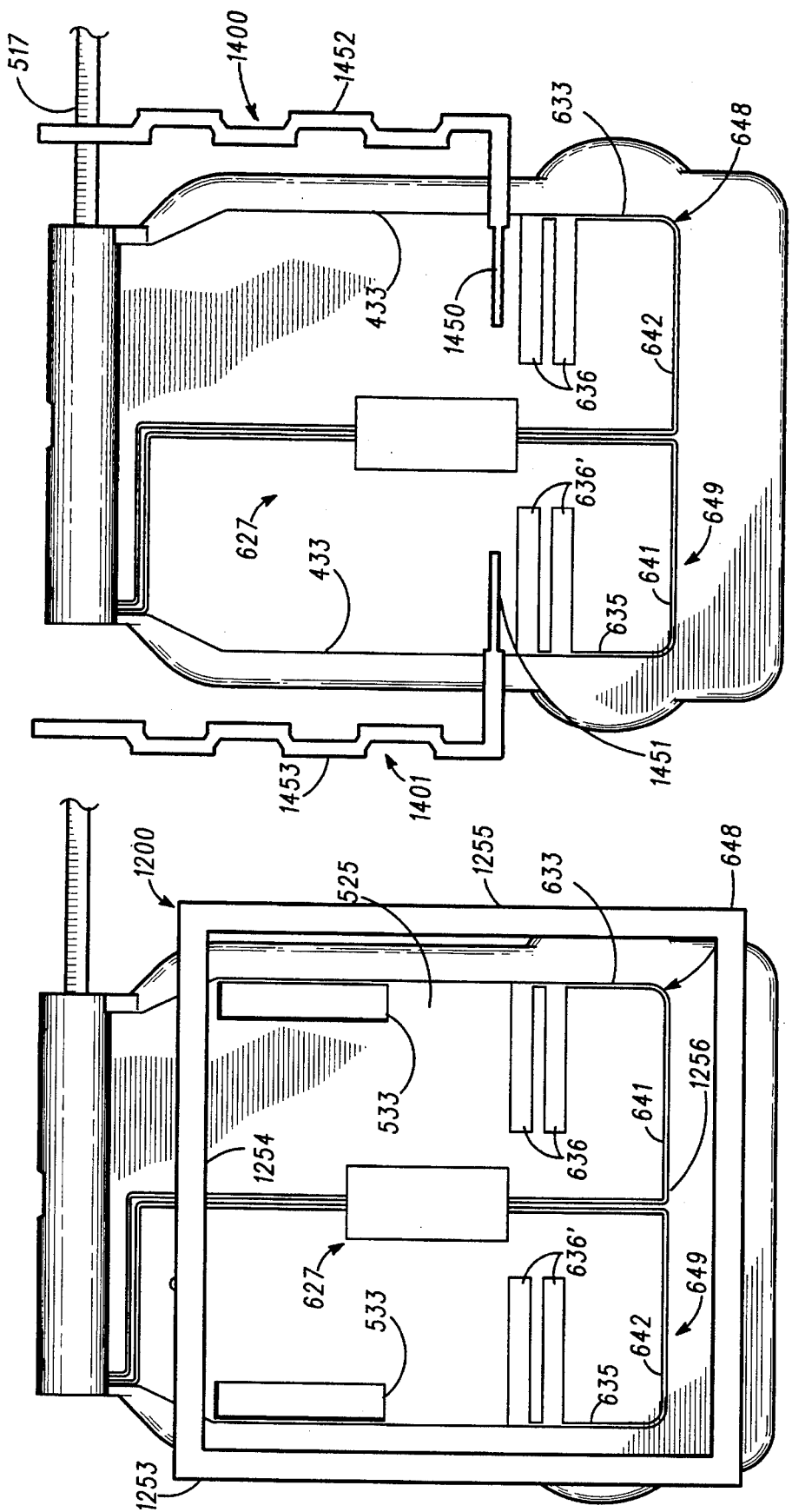
FIG. 13. is a top view schematically illustrating the position of the relative positioning of the flap antenna and parasitic radiator according to FIG. 12 in the collapsed position of the device.

When the flap 103 is closed, the loop type parasitic radiator is positioned relative to the flap antenna, as illustrated in FIG. 13. Sections 1256, 641 and 642 are inductively coupled when the flap is closed. The loop parasitic radiator 1200 and the flap antenna 107 are not coupled when the flap is open.

Figure 14:
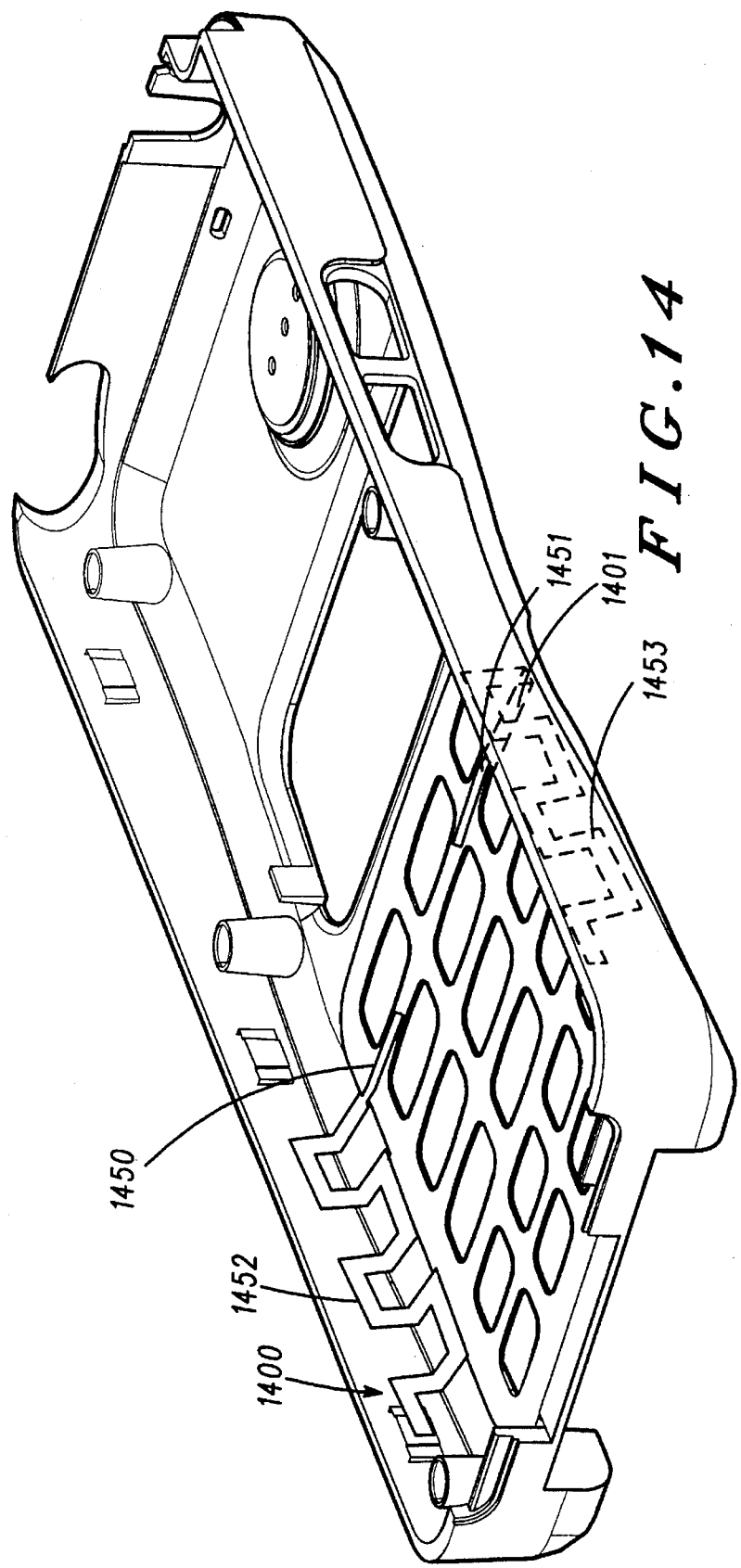
FIG. 14 is a fragmentary perspective view illustrating the interior of the front housing section of the radio telephone body and an alternate embodiment of the parasitic radiator.

According to another alternate embodiment of the parasitic radiators illustrated in FIG. 14, two end coupled parasitic radiators 1400 and 1401 are provided in place of radiator 108. Parasitic radiators 1400 and 1401 are generally L-shaped members. Radiator 1400 includes serpentine section 1452 and high impedance, low current portion 1450. Radiator 1401 includes serpentine 1453 and high impedance, low current portion 1451. Each of portions 1450 and 1451 are held in close proximity to a respective high impedance portion 950 and 951 of the flap antenna 107 when the flap is closed as illustrated in FIG. 15. This produces an end coupling, i.e. a capacitive or E-field coupling, between the flap antenna arms 648 and 649 and the two parasitic radiators 1400 and 1401. The parasitic radiators 1400 and 1401 are half wave length (or multiples thereof), thin strip electrical conductors, tuned to the operating frequency of the transceiver circuitry 515 when the flap is closed, and may be manufactured from the same material as parasitic radiator 108. The parasitic radiators 1400 and 1401 are not capacitively coupled when the flap antenna portion 103 is extended.

Figure 16:
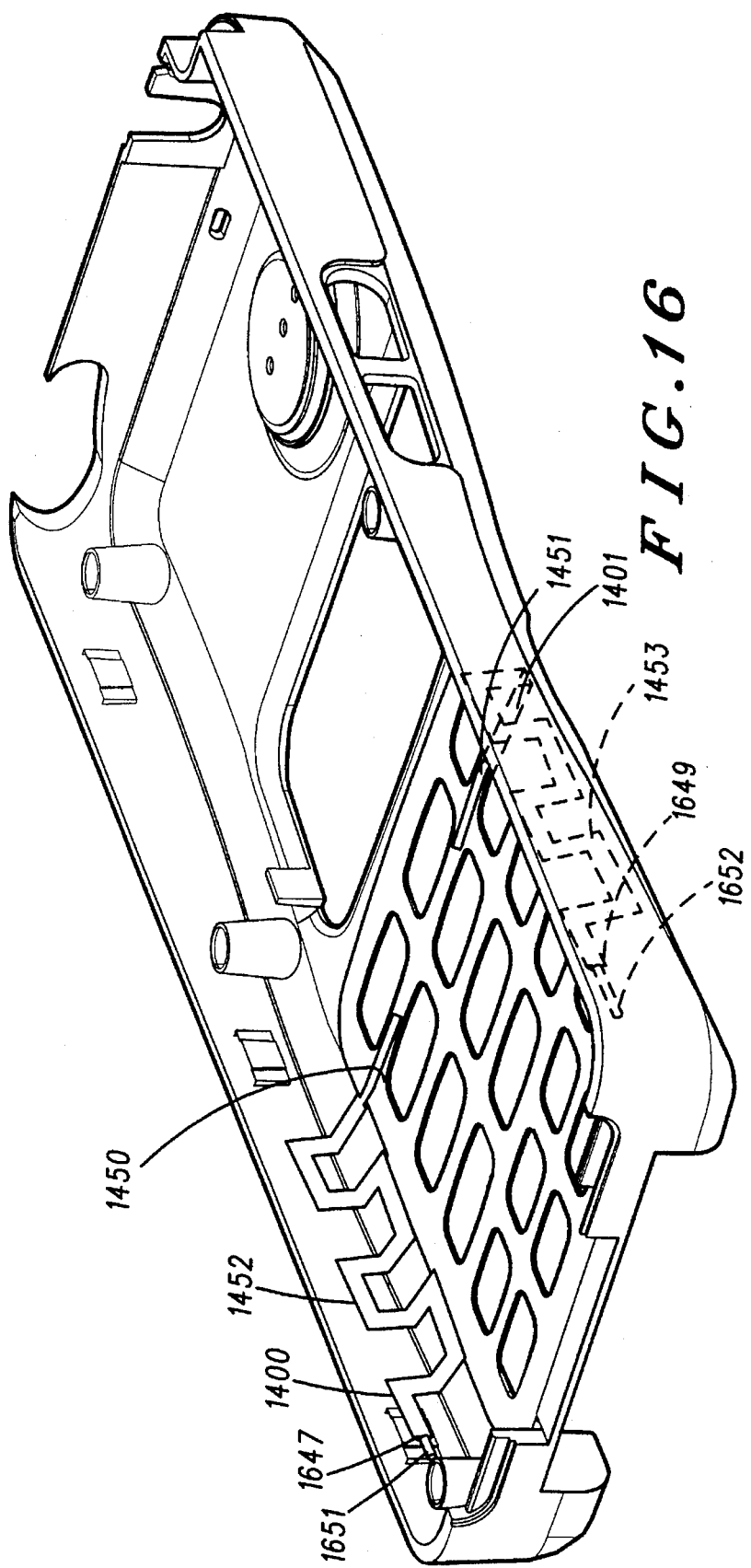
FIG. 16 is a fragmentary perspective view illustrating the interior of the front housing section of the radio telephone body and an alternate embodiment of the parasitic radiator.
Figure 17:
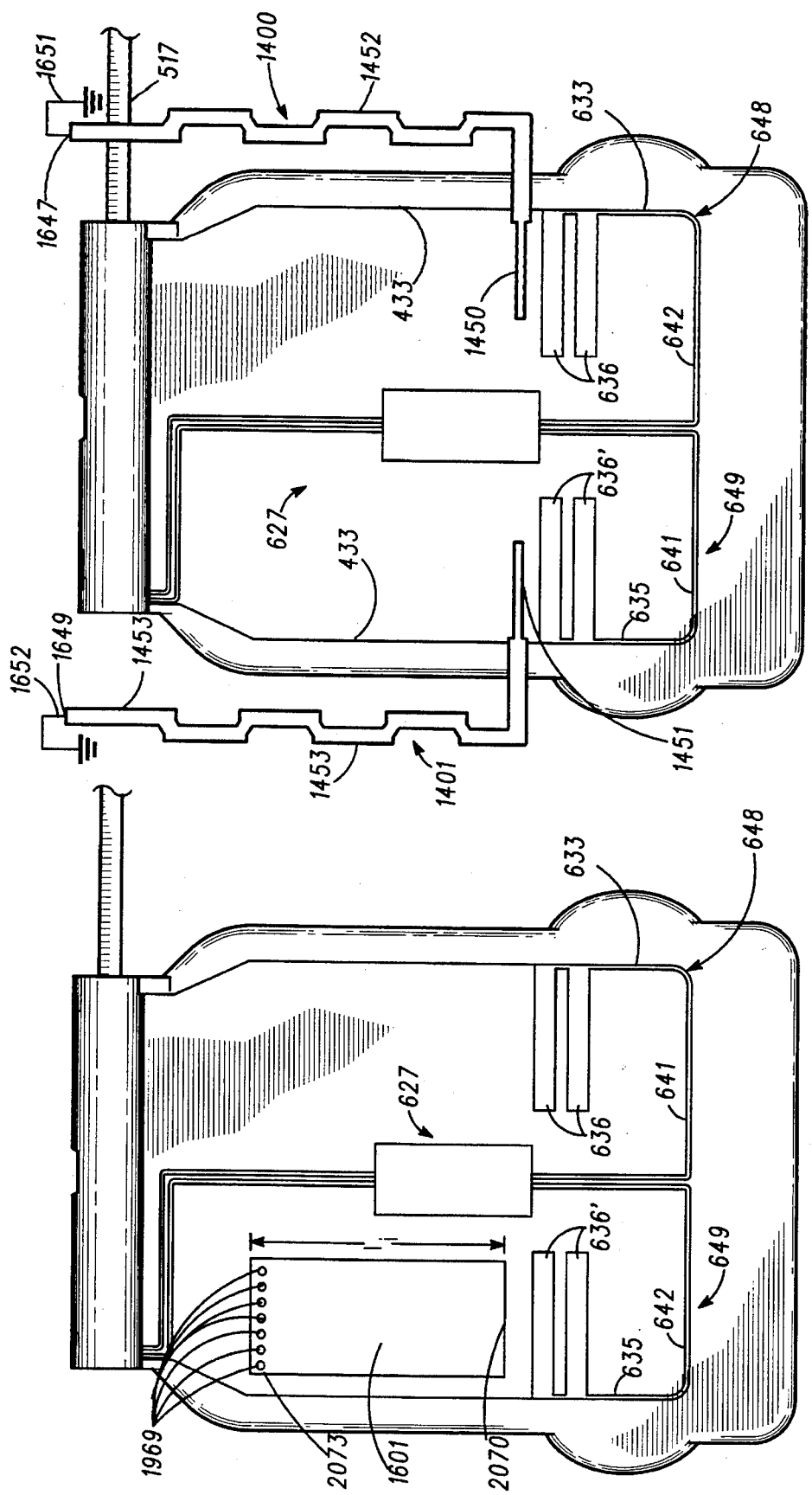
FIG. 17 is a top view schematically illustrating the position of the relative positioning of the flap antenna and parasitic radiator according to FIG. 16 in the collapsed position of the device.

Another alternate embodiment of the flap antenna is illustrated in FIG. 16. The embodiment of FIGS. 16 and 17 differs from the embodiment of FIGS. 14 and 15 in that the remote ends 1647 and 1649 of each parasitic radiator are connected to ground via conductors 1651 and 1652. Conductors 1651 and 1652 are connected to the earth plane of RF circuit board 315.

If these parasitic ends 1647 and 1649 are left disconnected to radio chassis ground, then each parasitic 1400 and 1401 needs to have a total length of half a wave, or an integer multiple of a half wave. That is, the total length of the leg portions 1452 and 1453 could be a half wave. If ends 1647 and 1649 are connected to ground, then each parasitic must have a total length of about one-quarter wavelength or any odd integer multiple thereof.

Although two parasitic radiators are illustrated, only parasitic 1400 (FIGS. 14 and 15) can be used without parasitic 1401. The end 1651 (FIGS. 16 and 17) of this single parasitic 1400 may be connected to ground or not when used without parasitic 1401.

Figure 18:
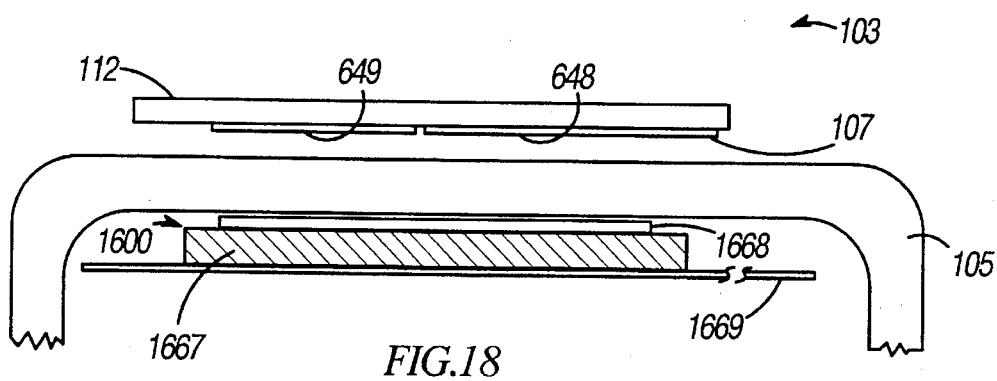
FIG. 18 is a cross sectional view illustrating a radio telephone including another alternate embodiment of the parasitic radiator and taken along plane XVIII—XVIII in FIG. 2.

Another alternate embodiment of the parasitic radiator is illustrated in FIGS. 18–24. FIG. 18 is a cross-section of a closed radio telephone showing a flap antenna 107 coupled to a parasitic radiator 1600 that is constructed as a patch, or microstrip antenna. This flap antenna 107 includes a dipole trace forming arms 648 and 649 assembled to polymeric flap rear housing 112. The first housing portion 101 includes parasitic radiator 1600. The parasitic radiator includes a ground plane 1666 affixed thereto. For example, the ground plane 1666 may be a layer of logic board 314 connected to chassis ground. A dielectric substrate 1667 fills the patch and a thin conductive element 1668 is the patch conductor. The thickness and dielectric constant of the dielectric layer 1667 determines the operating characteristics of the patch. Element 1666, 1667, and 1668 form the patch parasitic radiator.

Figure 19:
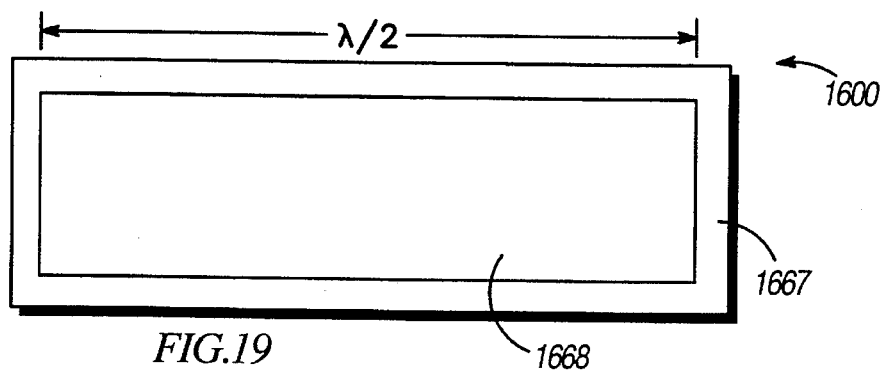
FIG. 19 is a top plan view illustrating a patch radiator for the embodiment of FIG. 18.
Figure 20:
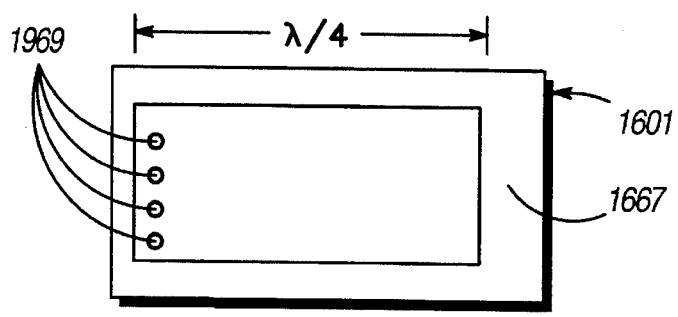
FIG. 20 is a top plan view illustrating a an alternate embodiment of a patch radiator for the embodiment of FIG. 18.
Figure 21:
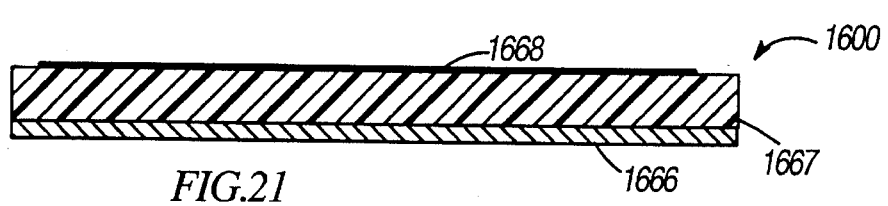
FIG. 21 is a cross-sectional view illustrating a patch antenna taken along plane XXI in FIG. 19.
Figure 22:
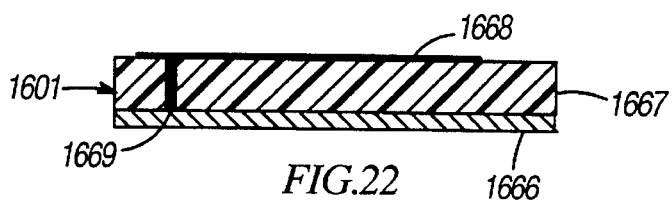
FIG. 22 is a cross-sectional view illustrating a patch antenna taken along plane XXII in FIG. 21.

FIGS. 19 and 21 illustrates a half wavelength patch radiator 1600. FIGS. 20 and 22 illustrate quarter wavelength patch radiator 1601. The quarter wavelength patch radiator includes electrically conductive pins 1669 which extend through, and are connected with, the patch conductor 1668 and the ground layer 1669. The dielectric layer may be any suitable dielectric, and the patch radiators 1600 and 1601 may be of any suitable conventional construction.

The patch radiator 1600 or 1601 is positioned behind an area of the front body section 105 which does not include keys 109. To this end, it is envisioned that some of the keys 109 would removed from housing 105 to make room for the patch radiator 1600 or 1601.

FIG. 23 shows the relative positioning of a rectangular patch radiator 1601 situated to be capacitively coupled to the plate 636 when the flap is closed. Patch radiator 1601 has an end 2073 which is connected to ground, and a high-impedance end 2070 end coupled to the flap antenna plate 950. The length L1 is approximately a quarter-wavelength in the dielectric the patch is filled with. The high impedance end 2070 of the patch is positioned close to the high impedance end 950 of flap antenna dipole arm 649 when the flap is closed. This provides the capacitive coupling between the patch and the flap antenna. Pins 1669 connect the patch antenna to ground layer 1666. Thus, it can be seen that the end remote from plate 1636 is connected to ground layer 1666. The patch antenna 1601 is thus capacitively coupled when the flap is closed.

Figure 24:
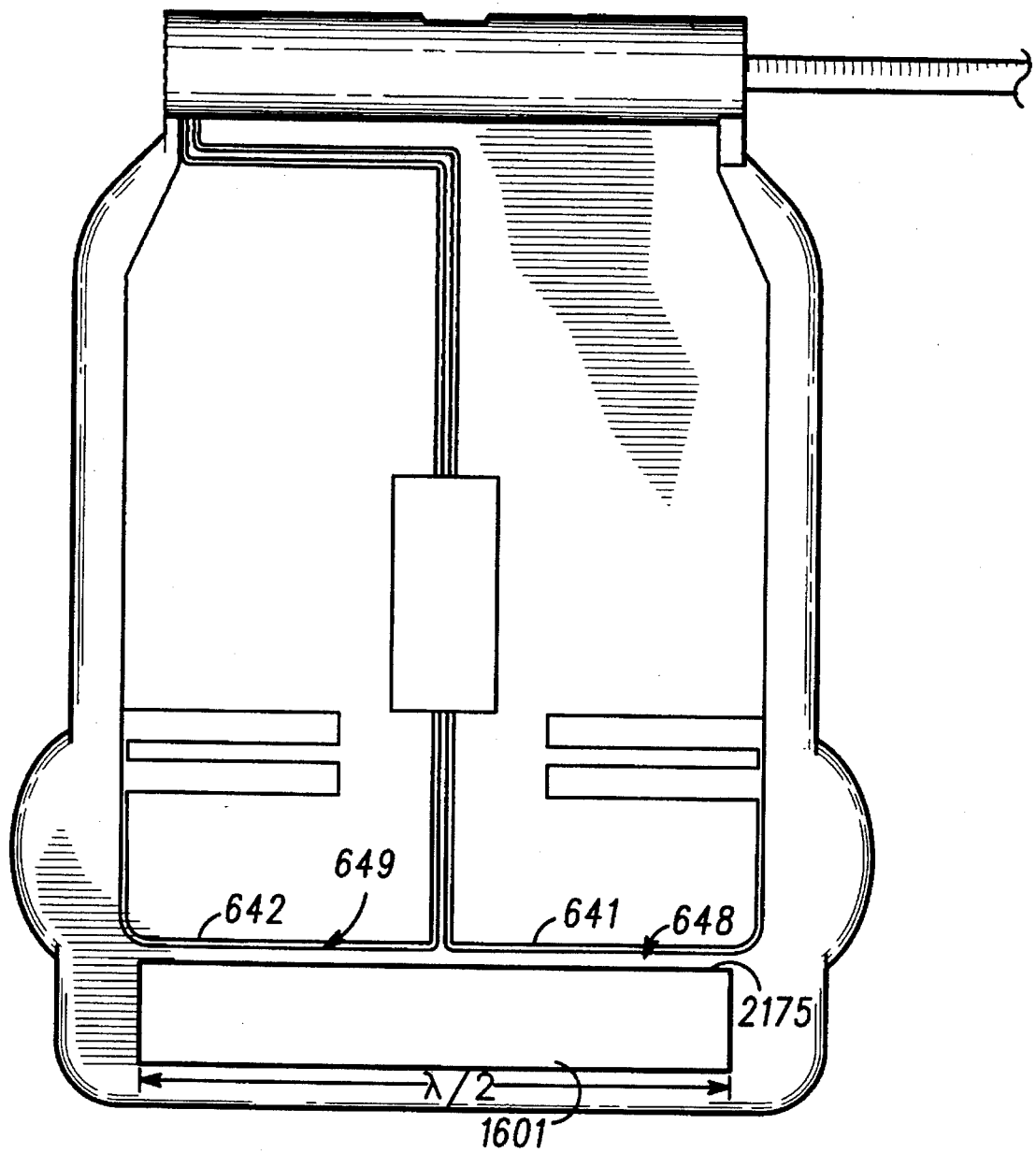
FIG. 24 is a top view schematically illustrating the position of the relative positioning of the flap antenna and parasitic radiator according to FIG. 19 in the collapsed position of the device.

FIG. 24 shows an inductive coupling for the flap antenna to the patch. A current edge 2175 of the patch 1600 is positioned close to the high current portions 641 and 642 of the flap antenna when the flap is closed. This produces the inductive coupling between the flap antenna and the parasitic patch in the closed position. The length L2 would be one-half wavelength to make the patch resonant. The patch antenna and the flap antenna 107 are not coupled when the flap 103 is extended to the open position.

What is claimed:

1. A multi-position antenna apparatus for a radio communication device including a housing having a first housing portion and a second housing portion which are interconnected such that they move relative to one another between a collapsed position and an extended position, the device including radio circuitry positioned in the first housing portion to transmit or receive signals of a predetermined signaling frequency, the antenna apparatus comprising:

a first antenna supported in the second housing portion, the first antenna coupled to the radio circuitry in the extended position and in the collapsed position; and a parasitic radiator supported in the first housing portion such that the parasitic radiator is only electrically coupled to the first antenna when the housing is in the collapsed position, the parasitic radiator being an L-shaped member, one arm of the L-shaped member positioned on one surface of the first housing portion and coupled to the first antenna when the housing is in the collapsed position and another arm of the L-shaped member positioned along another surface of the first housing portion.

2. The multi-position antenna apparatus as defined in claim 1 wherein the device includes a hinge assembly pivotably interconnecting the first and second housing portions and the first antenna is coupled to the radio circuitry through the hinge assembly.

3. The multi-position antenna apparatus as defined in claim 1, wherein the first antenna is a dipole including two arms positioned on the second housing, and inductively coupled to the parasitic radiator.

4. The multi-position antenna as defined in claim 3, wherein the parasitic radiator includes one arm mounted to a front surface of the first housing portion and a second arm mounted to a side surface of the first housing portion.

5. The multi position antenna as defined in claim 1, wherein an end of the parasitic radiator is coupled to ground.

6. The multi position antenna apparatus as defined in claim 1, wherein the first antenna is a dipole including two arms positioned on the second housing portion, and capacitively coupled to the parasitic radiator.

7. The multi position antenna apparatus as defined in claim 6, wherein an end of the parasitic radiator is coupled to ground.

8. A multi-position antenna apparatus for a radio communication device including a housing having a first housing portion and a second housing portion which are interconnected such that they move relative to one another between a collapsed position and an extended position, the device including radio circuitry positioned in the first housing portion to transmit or receive signals of a predetermined signaling frequency, the antenna apparatus comprising:

a first antenna supported in the second housing portion, the first antenna coupled to the radio circuitry in the extended position and in the collapsed position; and a parasitic radiator supported in the first housing portion such that the parasitic radiator is only electrically coupled to the first antenna when the housing is in the collapsed position, the parasitic radiator is a patch radiator including a planar conductor mounted above a planar ground member, the patch radiator positioned in the first housing such that the planar conductor is positioned between the first antenna and the planar ground member when the housing is in the collapsed position.

9. The multiposition antenna apparatus as defined in claim 8, wherein the patch radiator includes pins electrically connecting the patch conductor to the ground member.

10. The multiposition antenna apparatus as defined in claim 8, wherein the patch radiator postioned below a front surface of the first housing portion with the planar conductor positioned between the first antenna and the planar ground member when the housing is in the collapsed position.

11. The multi-position antenna apparatus as defined in claim 8, wherein the device includes a hinge assembly pivotably interconnecting the first and second housing portions and the first antenna is coupled to the circuitry through the hinge assembly.

12. The multi-position antenna apparatus as defined in claim 8 wherein the first antenna includes two conductors which are positioned on the second housing portion.

13. A multi-position antenna apparatus for a radio communication device including a housing having a first housing portion and a second housing portion which are interconnected such that they move relative to one another between a collapsed position and an extended position, and radio circuitry positioned in the first housing portion to transmit or receive signals at a predetermined signaling frequency, the antenna apparatus comprising:

a first antenna supported in the second housing portion, the first antenna coupled to the radio circuitry in the extended position and in the collapsed position; and a parasitic radiator supported in the first housing portion such that the parasitic radiator is only electrically coupled to the first antenna when the housing is in the collapsed position, wherein the parasitic radiator is a loop conductor having a first portion mounted to a front surface of the first housing portion for coupling to the first antenna when the flap is closed, a second portion and a third portion positioned along sidewalls of the housing, and a fourth portion extending between the second and third portions.

14. The multi position antenna apparatus as defined in claim 13, wherein the loop conductor has a perimeter of a full wavelength.

15. The multi-position antenna apparatus as defined in claim 14, wherein the device includes a hinge assembly pivotably interconnecting the first and second housing portions and the first antenna is coupled to the circuitry through the hinge assembly.

16. The multi-position antenna apparatus as defined in claim 14 wherein the first antenna includes two conductors which are positioned on the second housing portion and being coupled to the first portion when the housing is in the collapsed position.

17. A multi-position antenna apparatus for a radio communication device including a housing having a first housing portion and a second housing portion which are interconnected such that they move relative to one another between a collapsed position and an extended position, and radio circuitry positioned in the first housing portion to transmit or receive signals at a predetermined signaling frequency, the antenna apparatus comprising:

a first antenna supported in the second housing portion, the first antenna coupled to the radio circuitry in the extended position and in the collapsed position; and a parasitic radiator supported in the first housing portion such that the parasitic radiator is only coupled to the first antenna when the housing is in the collapsed position, wherein an end of the parasitic radiator is connected to ground.

18. The multi-position antenna apparatus as defined in claim 17 wherein the device includes a hinge assembly pivotably interconnecting the first and second housing portions and the first antenna is coupled to the circuitry through the hinge assembly.

19. The multi-position antenna apparatus as defined in claim 18, wherein the first antenna includes two arms positioned on the second housing.

20. The multi position antenna apparatus as defined in claim 18, wherein the parasitic radiator includes a generally L-shaped member having one arm inductively coupled to the first antenna when the housing is in the collapsed position.

* * * * *